(12) United States Patent
Taguchi

(10) Patent No.: US 11,623,776 B2
(45) Date of Patent: Apr. 11, 2023

(54) BINDING MACHINE AND BINDING METHOD

(71) Applicant: MAX CO., LTD., Tokyo (JP)

(72) Inventor: Satoshi Taguchi, Tokyo (JP)

(73) Assignee: MAX CO., LTD., Tokyo (JP)

( * ) Notice: Subject to any disclaimer, the term of this patent is extended or adjusted under 35 U.S.C. 154(b) by 0 days.

(21) Appl. No.: 16/997,002

(22) Filed: Aug. 19, 2020

(65) Prior Publication Data

US 2021/0053707 A1 Feb. 25, 2021

(30) Foreign Application Priority Data

Aug. 23, 2019 (JP) .............................. JP2019-153185

(51) Int. Cl.
*B65B 13/34* (2006.01)
*B32B 37/00* (2006.01)
(Continued)

(52) U.S. Cl.
CPC ........ *B65B 13/345* (2013.01); *B32B 37/0046* (2013.01); *B32B 37/1292* (2013.01);
(Continued)

(58) Field of Classification Search
CPC ..... B65B 13/345; B65B 13/025; B65B 13/06; B65B 13/18; B32B 37/0046; B32B 37/1292; B32B 2038/0052; B25C 5/0207; B25C 5/0285; A01G 17/08; A01G 9/128; A01G 17/085
See application file for complete search history.

(56) References Cited

U.S. PATENT DOCUMENTS 2,041,780 A * 5/1936 Rowe ..................... B25C 7/00
227/63
4,315,589 A 2/1982 Soong
(Continued)

FOREIGN PATENT DOCUMENTS

CN 107517770 A 12/2017
CN 107517771 A 12/2017
(Continued)

OTHER PUBLICATIONS

Extended European Search Report for EP 20191988.3 dated Feb. 23, 2021, 11 pages.

*Primary Examiner* — Michael N Orlando
*Assistant Examiner* — Christopher W Raimund
(74) *Attorney, Agent, or Firm* — Weihrouch IP

(57) ABSTRACT

A binding machine that binds objects with a tape, the binding machine includes a staple magazine unit configured to accommodate a plurality of staples, a main handle, a clincher arm configured to approach a leading staple of the plurality of staples and a clincher configured to bend the leading staple. The clincher has, on a surface thereof, a first groove that extends in an acute angle direction with respect to an axial direction of a rotation shaft of the clincher arm and has a first groove length and a first groove width, and a second groove that extends in an acute angle direction with respect to the axial direction of the rotation shaft of the clincher arm and has a second groove length and a second groove width. The second groove is disposed offset with respect to the first groove in a width direction of the first groove.

11 Claims, 19 Drawing Sheets

(51) Int. Cl.
*B32B 37/12* (2006.01)
*B65B 13/02* (2006.01)
*B65B 13/06* (2006.01)
*B32B 38/00* (2006.01)

(52) U.S. Cl.
CPC ............ *B65B 13/025* (2013.01); *B65B 13/06* (2013.01); *B32B 2038/0052* (2013.01)

(56) References Cited

U.S. PATENT DOCUMENTS

| | | |
|---|---|---|
| 2004/0046001 A1 | 3/2004 | Jairam |
| 2008/0104886 A1 | 5/2008 | Nakamura et al. |
| 2015/0181810 A1 | 7/2015 | Cho |
| 2017/0359972 A1 | 12/2017 | Hayashi et al. |
| 2017/0359973 A1 | 12/2017 | Taguchi |
| 2017/0361957 A1 | 12/2017 | Takemura et al. |
| 2017/0361958 A1 | 12/2017 | Hayashi et al. |
| 2017/0361959 A1 | 12/2017 | Ishiguro et al. |
| 2020/0113141 A1 | 4/2020 | Taguchi |

FOREIGN PATENT DOCUMENTS

| | | |
|---|---|---|
| CN | 107517774 A | 12/2017 |
| CN | 107517817 A | 12/2017 |
| CN | 107517818 A | 12/2017 |
| EP | 0027336 A1 | 4/1981 |
| JP | 2003-063507 A | 3/2003 |
| JP | 2004-224412 A | 8/2004 |
| JP | 2017-222403 A | 12/2017 |
| TW | 201020173 A | 6/2010 |
| WO | 2006-067886 A1 | 6/2006 |
| WO | 2009031665 A1 | 3/2009 |

\* cited by examiner

BINDING MACHINE AND BINDING METHOD

CROSS REFERENCE TO RELATED APPLICATIONS

This application claims priority to Japanese Patent Application No. 2019-153185 filed on Aug. 23, 2019, the content of which is incorporated herein by reference.

TECHNICAL FIELD

The present invention relates to a binding machine and a binding method.

BACKGROUND ART

A binding machine for gardening has been used for binding work during cultivation of agricultural crops. For example, in cultivation of agricultural crops such as cucumbers, grapes, tomatoes, pears, and plums, a binding machine for gardening has been used in order to bind vines and stems of plants to support rods and nets. Such a binding machine includes a clincher that bends a staple to fix an end of a tape.

A binding machine disclosed in JP2017-222403A is provided with an ejection port formed of the same component as that of a staple magazine body to prevent dimensional change of the ejection port, and thus prevent problems such as the staple being caught and driving of two staples.

A binding machine disclosed in JP2004-224412A is configured to accurately pull out a binding tape and continuously perform binding operations. FIG. 6 in JP2004-224412A illustrates a state where the binding tape is cut cleanly by inserting a cutting cutter between a pressing piece and a pressing plate that bind the binding tape.

However, when the binding tape is displaced to the left and right due to a posture or the like at the time of binding, the staple may be displaced with respect to the binding tape. Since the binding tape cannot be sufficiently held when the staple is displaced, the binding tape that should have been bound may come off later.

When a width of the binding tape is increased, which serves as a measure for avoiding such a situation, the cost of the binding tape is increased. Alternatively, when a crown width of the staple is reduced, legs of the staple need to be shortened. When the legs of the staple are shortened, moment for bending the legs is reduced, which deteriorates the workability.

SUMMARY OF INVENTION

Illustrative aspects of the present invention provide a binding machine capable of preventing the bounding tape from coming off from vines or stems of a plant even when the staple is displaced.

According to an aspect of the present invention, a binding machine that binds objects with a tape, the binding machine includes: a staple magazine unit configured to accommodate a plurality of staples; a main handle to which the staple magazine unit is attached; a clincher arm rotatably attached to the main handle such that the clincher arm approaches a leading staple of the plurality of staples; and a clincher provided on the clincher arm, and configured to bend the leading staple, which is driven from the staple magazine unit and penetrates overlapped portions of the tape, when the clincher arm is rotated to approach the leading staple. The clincher has, on a surface thereof, a first groove that extends in an acute angle direction with respect to an axial direction of a rotation shaft of the clincher arm and has a first groove length and a first groove width, and a second groove that extends in an acute angle direction with respect to the axial direction of the rotation shaft of the clincher arm and has a second groove length and a second groove width. The second groove is disposed offset with respect to the first groove in a width direction of the first groove.

According to another aspect of the present invention, a binding method for binding objects with a tape implemented by using a binding machine, the method includes: winding the tape around the objects to bound such that two portions spaced apart of the tape overlap with each other; penetrating overlapped portions of the tape with at least a first leg portion of a staple, which includes a crown portion having a length greater than half a width of the tape, the first leg portion having a length greater than half the length of the crown portion and less than the length of the crown portion and extending from one end of the crown portion, and a second leg portion having a length greater than half the length of the crown portion and less than the length of the crown portion and extending from another end of the crown portion; and sandwiching the overlapped portions of the tape with the crown portion and the first leg portion by bending a first connection portion between the first leg portion and the crown portion such that a tip of the first leg portion is deviated from the crown portion, and sandwiching the overlapped portions of the tape with the crown portion and the second leg portion by bending a second connection portion between the second leg portion and the crown portion such that a tip of the second leg portion is deviated from the crown portion and is substantially in parallel to the first leg portion.

According to another aspect of the present invention, a binding machine that binds objects with a tape, the binding machine includes: a tape overlapping member configured to wind the tape around the objects to bound such that two portions spaced apart of the tape overlap with each other; a penetrating member configured to penetrate overlapped portions of the tape with at least a first leg portion of a staple, which includes a crown portion having a length greater than half a width of the tape, the first leg portion having a length greater than half the length of the crown portion and less than the length of the crown portion and extending from one end of the crown portion, and a second leg portion having a length greater than half the length of the crown portion and less than the length of the crown portion and extending from another end of the crown portion; and a sandwiching member configured to sandwich the overlapped portions of the tape with the crown portion and the first leg portion by bending a first connection portion between the first leg portion and the crown portion such that a tip of the first leg portion is deviated from the crown portion, and configured to sandwich the overlapped portions of the tape with the crown portion and the second leg portion by bending a second connection portion between the second leg portion and the crown portion such that a tip of the second leg portion is deviated from the crown portion and is substantially in parallel to the first leg portion.

DESCRIPTION OF EMBODIMENTS

Figure 1:
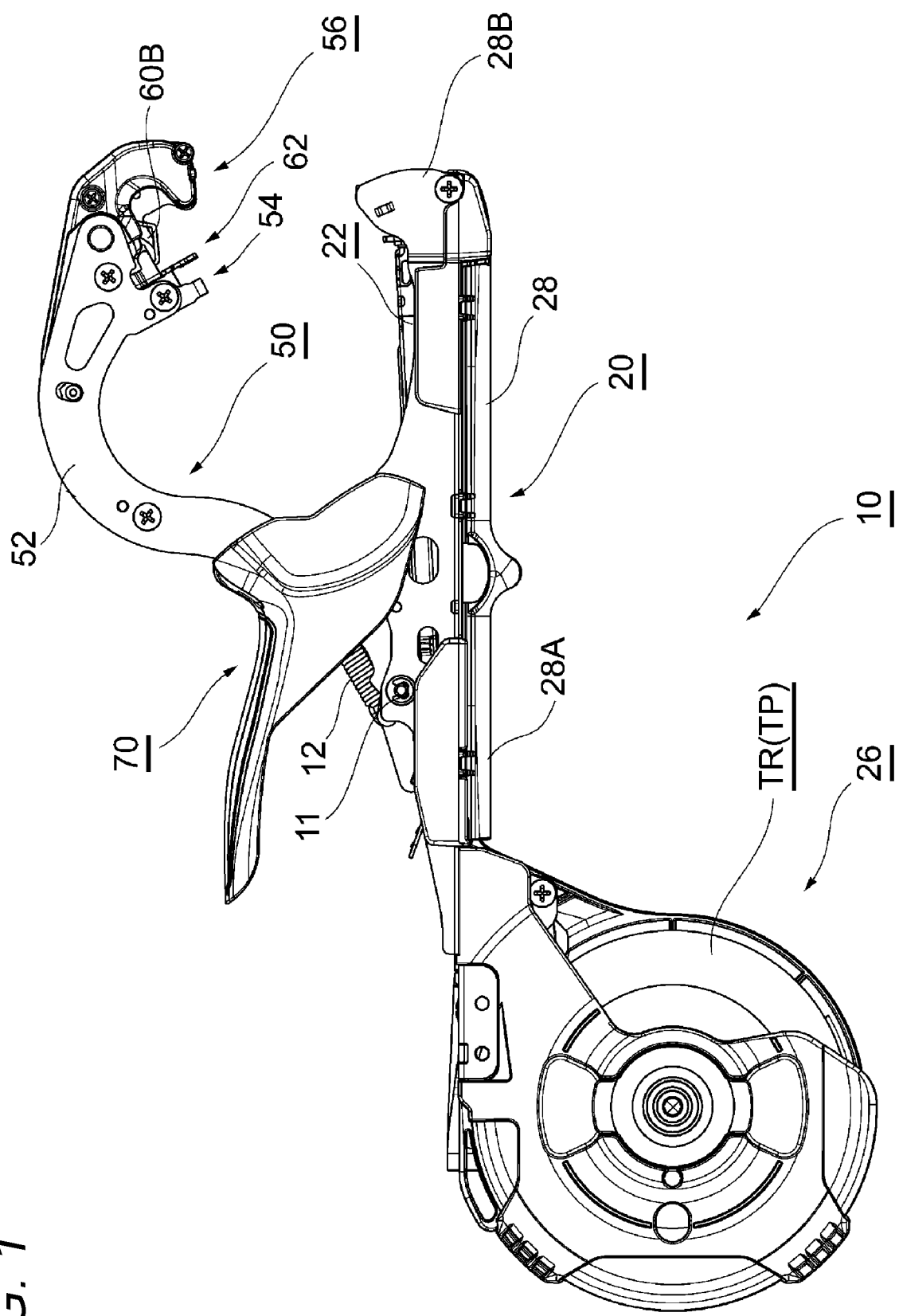
FIG. 1 is a right side view of a binding machine according to a first embodiment of the present invention.
Figure 2:
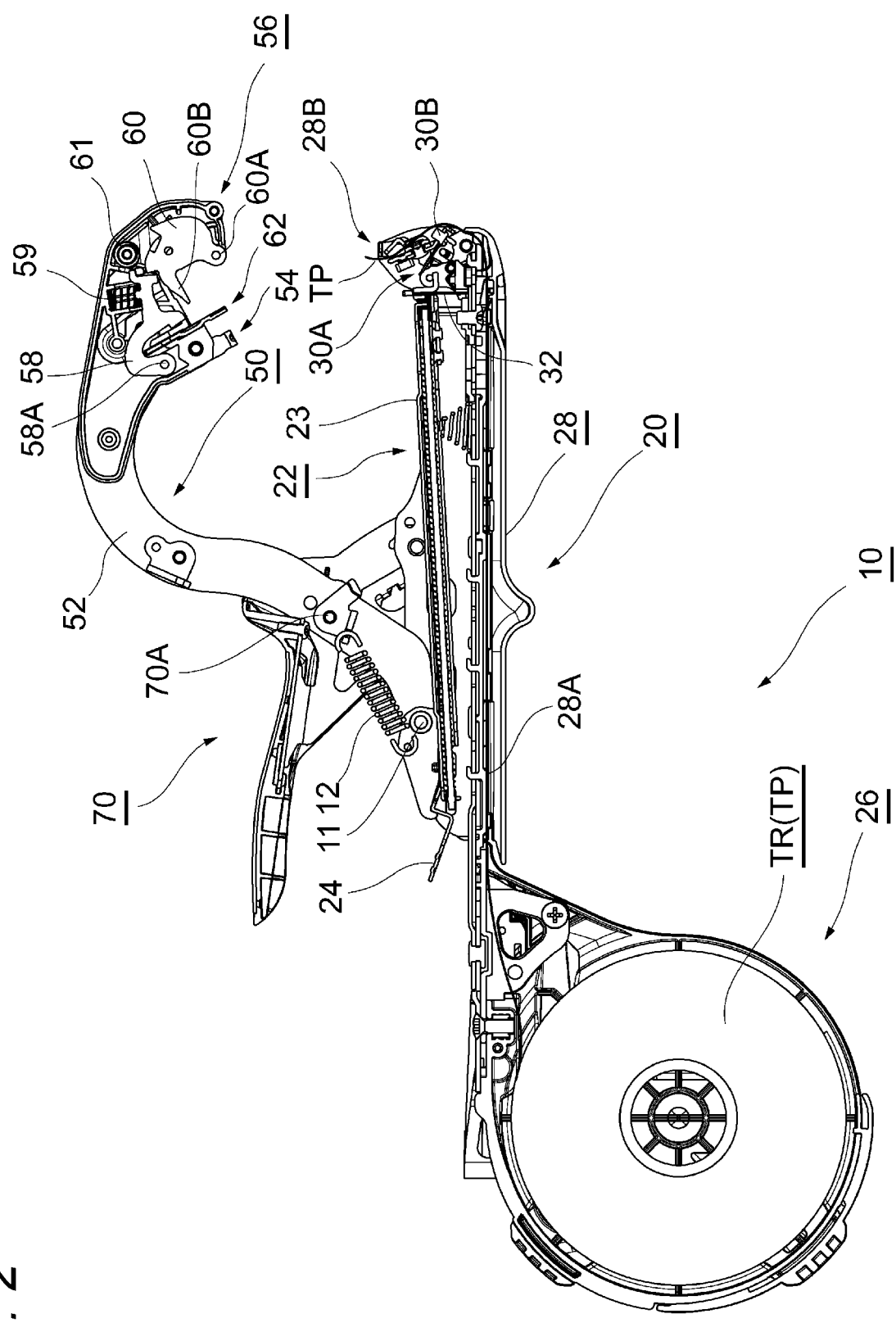
FIG. 2 is a cross-sectional view of the binding machine in a standby state.

Hereinafter, embodiments of the present invention will be described with reference to the drawings. The following embodiments are examples for illustrating the present invention and the present invention is not intended to be limited to those embodiments. FIG. 1 is a right side view of a binding machine 10 for gardening according to the present embodiment. FIG. 2 is a cross-sectional view of the binding machine 10 in FIG. 1.

In the present embodiment, for convenience, a side (a right side in FIG. 1) toward which a tape holder 28A extends from a tape magazine unit 26 in which the tape TP for binding is accommodated, heading for a tape guide 28B provided at a distal end of a binding machine 10 from which the tape TP is pulled out, may be referred to as a "front side", and an opposite side (a left side in FIG. 1) may be referred to as a "rear side".

Further, a side (upper side in FIG. 1) toward which the tape TP is pulled out from the tape guide 28B, heading for a tape holding unit 56 in a standby state, may be referred to as an "upper side", and an opposite side (lower side in FIG. 1) may be referred to as a "lower side". Hereinafter, a main configuration of the binding machine 10 will be outlined below. Thereafter, a characteristic structure of the binding machine 10 will be described in detail.

The binding machine 10 for gardening according to the present embodiment can be used, for example, in attraction binding operations on an agricultural crop (an example of an "object S to be bound"). The binding machine 10 includes a main handle 20, a staple magazine unit 22 rotatably attached to the main handle 20, a clincher arm 50 rotatably attached to the main handle 20, and an operation handle 70 rotatably attached to the clincher arm 50.

The main handle 20 is a member formed in an elongated linear shape. The main handle 20 includes a tape transport unit 28, a tape cutting unit 30, and a staple driver 32. A tape magazine unit 26 is attached to a rear end portion of the main handle 20. The main handle 20 and the tape magazine unit 26 may be integrally formed.

The tape magazine unit 26 is a mechanism that accommodates the tape TP wound on a reel (hereinafter, the wound tape TP may be referred to as a tape reel TR (an example of a "wound binding tape")). As illustrated in FIG. 1 and the like, the tape magazine unit 26 is provided at the rear end portion of the main handle 20.

The tape transport unit 28 includes the tape holder 28A and the tape guide 28B. The tape holder 28A is a path for transporting the tape TP from the tape magazine unit 26 to the tape guide 28B, and is laid along a longitudinal direction of the main handle 20. The tape holder 28A includes a bottom portion facing one surface of the tape TP, and a lid portion facing the other surface of the tape TP (hereinafter, the other surface of the tape TP may be referred to as a "back surface"). The bottom portion and the lid portion are configured to be openable and closable with one side along the longitudinal direction as a fulcrum, for example.

The tape guide 28B (see FIGS. 2 to 8) is a member that guides a tip of the tape TP upward from the tape holder 28A. The tape guide 28B is rotatably provided at a front end portion of the tape holder 28A. The tape guide 28B has wall surfaces facing at least a part of each of a front surface, a back surface, and both side portions of the tape TP, so as for the inserted tape TP not to come off easily.

The tape cutting unit 30 includes a cutting blade 30A that cuts the tape TP, and a lock mechanism 30B that locks and unlocks the cutting blade 30A. During replacement of the cutting blade 30A, the lock mechanism 30B releases locking of the cutting blade 30A and the cutting blade 30A is removed. The cutting blade 30A is provided rotatably and integrally with the tape guide 28B, and is biased by an elastic member (not illustrated) so as to face the rear side during a standby state and a holding operation. When performing a binding operation, the tape guide 28B is pressed against a tip portion 60B of a tape catch 60, the tape guide 28B and the cutting blade 30A rotate against a biasing force of the elastic member (not illustrated), and a tip portion of a blade edge of the cutting blade 30A moves so as to face the tape TP.

As a mechanism that cuts the tape TP, various mechanisms can be employed. For example, the tape TP may be rotated in conjunction with the tape guide 28B, thereby cutting the tape TP; the tape guide 28B and the cutting blade 30A may be configured to be movable in a straight advancing direction and the cutting blade 30A may be moved in a linear direction, thereby cutting the tape TP; and a member restraining the tape TP such as the tape guide 28B may be moved so as to cause the tape TP to be cut by the stationary cutting blade 30A.

The staple driver 32 is a plate that is attached to the main handle 20 so as to face a vicinity of a front end of a staple accommodating portion 23 of the staple magazine unit 22. The staple driver 32 is formed to have a thickness, for example, substantially the same as a width of a staple ST or smaller than the width of the staple ST so as to drive only one staple ST.

When the clincher arm 50 to be described below rotates in a closing direction with respect to the main handle 20, the staple magazine unit 22 is pressed by the clincher arm 50 to rotate in a direction of approaching the main handle 20. Therefore, an upper end of the staple driver 32 attached to the main handle 20 relatively enters a space in the staple accommodating portion 23 to drive a leading staple ST in the staple accommodating portion 23 upward.

The driven staple ST is clinched by a clincher 54 after penetrating the tape TP. Two overlapped tapes TP can be held between bent leg portions 101 and 102 of the staple ST and a crown portion 100 of the staple ST.

The staple magazine unit 22 is a member formed in an elongated linear shape. A rear end portion of the staple magazine unit 22 is attached to the rear end portion of the main handle 20 so as to be rotatable around a rotation shaft. However, since a rotation angle thereof is small, the staple magazine unit 22 may be expressed as being swingably attached to the main handle 20.

The staple magazine unit 22 includes the staple accommodating portion 23 that accommodates the staple ST, and a pusher unit 24. The staple accommodating portion 23 is disposed along the longitudinal direction of the main handle 20. In order to accommodate the staple ST therein, the staple accommodating portion 23 includes a bottom surface formed to be elongated along the longitudinal direction of the main handle 20, two sidewall surfaces standing from the bottom surface and facing each other, and a front wall surface against which a side surface of the leading staple ST is pressed. A configuration of the staple magazine unit 22 will be described in detail later.

In the staple accommodating portion 23, a plurality of staples ST can be accommodated. Adjacent staples ST can be connected to each other with an adhesive, for example, to form a column of a staple group as a whole. A configuration of the staple ST will be described in detail later.

The pusher unit 24 is, for example, a member removably attached to the staple accommodating portion 23 in order to push the staples ST accommodated in the staple accommodating portion 23 forward. The pusher unit 24 includes a compression spring that pushes staples ST at the rear end among the plurality of staples ST forward, and a cover that covers the staple accommodating portion 23 from above. By pulling out the pusher unit 24 from the staple accommodating portion 23 and opening the staple accommodating portion 23 to above, the staples ST can be set in the staple accommodating portion 23 from above.

The clincher arm 50 is attached by a rotation shaft portion 11 provided in a vicinity of a rear end portion so as to be rotatable with respect to the main handle 20, and is biased by a tension spring 12 in a direction in which a gap between the clincher arm 50 and the main handle 20 increases (a direction in which the clincher arm 50 opens). The clincher arm 50 includes an arm portion 52, the clincher 54, and the tape holding unit 56 (an example of a "holding unit"). The arm portion 52 has a shape that extends in a curved manner up to a tip portion so that a C-shaped opening can be formed between the arm portion 52 and the main handle 20.

The clincher 54 is a member that bends and clinches first and second leg portions 101 and 102 (see FIG. 9) of the staple ST. The clincher 54 is provided at a tip portion of the clincher arm 50 so as to face a tip of the staple driver 32 when the clincher arm 50 rotates in the closing direction.

With such a configuration, the first and second leg portions 101 and 102 of the staple ST driven by the staple driver 32 are clinched by the clincher 54 and bent inward. The configuration including the clincher 54 that is provided on the clincher arm 50 and that is for performing binding processing may be referred to as a "binding portion". A configuration of the clincher 54 will be described in detail later.

The tape holding unit 56 is a mechanism that holds an end portion of the tape TP pulled out from the tape guide 28B at a tip of the main handle 20. The tape holding unit 56 is provided at a tip of the arm portion 52 of the clincher arm 50. The tape holding unit 56 includes a lock plate 58, the tape catch 60, and a tape plate 62.

The lock plate 58 is configured to be rotatable with a shaft portion 58A provided at one end portion thereof serving as a fulcrum, and the other end portion thereof is biased toward the tape catch 60 by a coil spring 59. The lock plate 58 locks the tape catch 60 by engaging with the tape catch 60 under the biasing of the coil spring 59, and can fix the tape catch 60 at a position separated from the tape plate 62.

The tape catch 60 is provided so as to be rotatable with a shaft portion 60A serving as a fulcrum, and is biased toward the tape plate 62 by a torsion coil spring 61. The tape catch 60 is configured such that, when locking by the lock plate 58 is released at the time of pulling out of the tape, the tip portion 60B having a tapered shape is moved toward the tape plate 62 under the biasing of the torsion coil spring 61.

The tape plate 62 is disposed to face the tape catch 60, and a tip portion thereof extends from the lock plate 58 toward the tape cutting unit 30. The extended portion of the tape plate 62 and the tip portion 60B of the tape catch 60 clamp the tape TP. When a user reduces a force of gripping the operation handle 70 while the tape TP is being held, the clincher arm 50 is rotated in the opening direction by the tension spring 12, and thus the tape TP can be pulled upward via the tape guide 28B.

The operation handle 70 is a portion to be gripped by the user. A shaft portion 70A at a substantially intermediate part thereof is rotatably attached to the clincher arm 50, and a front end portion of the operation handle 70 is attached to the main handle 20. With such a configuration, the clincher arm 50 is configured to be openable and closable relative to the main handle 20 according to an opening/closing operation of the operation handle 70, based on a principle of leverage using a portion to be gripped by a user as a force application point, a rotation shaft of the clincher arm 50 as a fulcrum, and the front end portion attached to the main handle 20 as an action point.

[Operation of Binding Machine 10]

Figure 3:
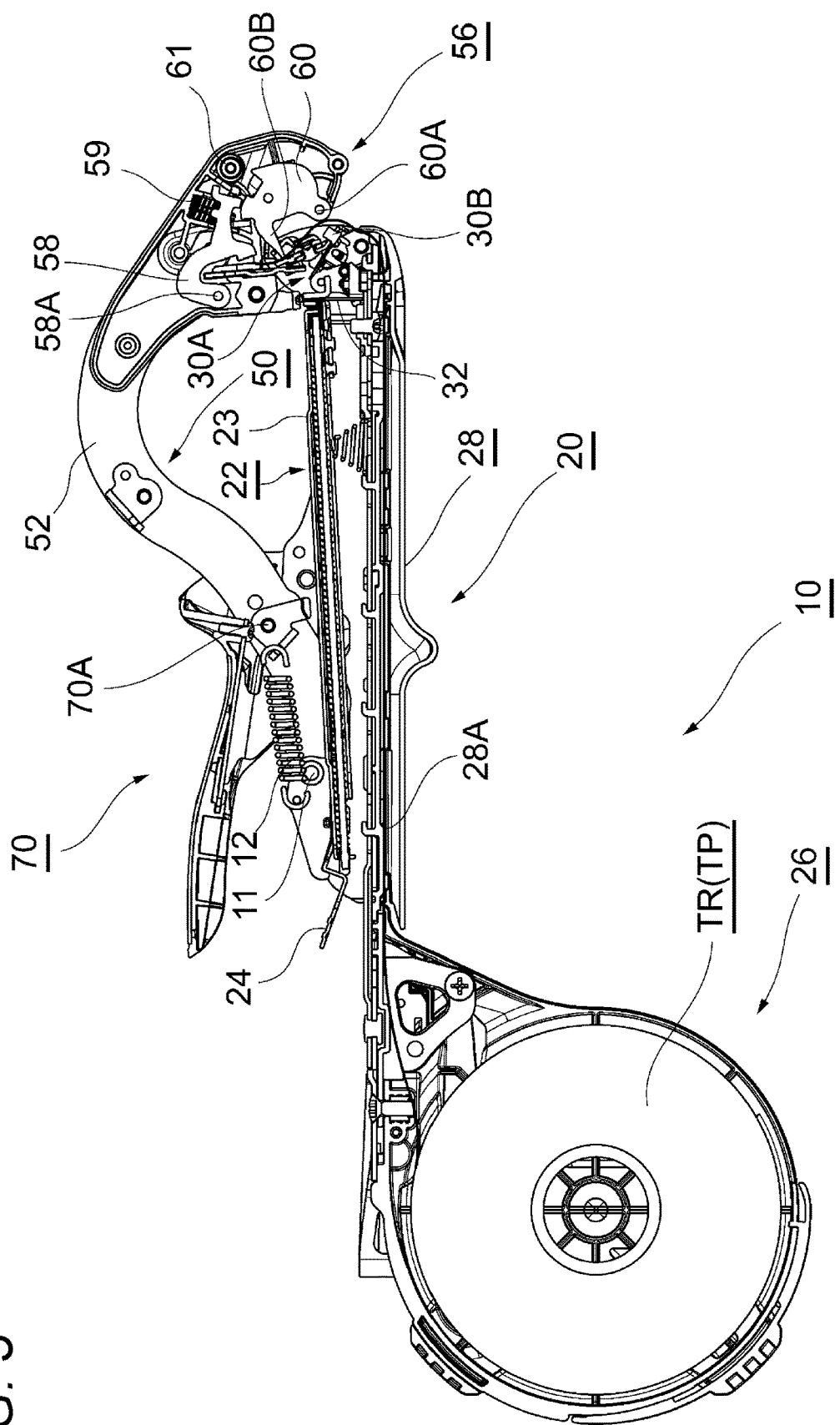
FIG. 3 is a cross-sectional view of the binding machine in a state where a tape is held.

Next, the operation of the binding machine 10 will be described with reference to FIGS. 4 to 8. The clincher arm 50 is constantly biased by the tension spring 12, and in a standby state illustrated in FIGS. 1 and 2, the clincher arm 50 is in an open state with respect to the main handle 20. When the user grips the operation handle 70 and the main handle 20 from this state, the clincher arm 50 is rotated in the closing direction with respect to the main handle 20 as illustrated in FIG. 3.

Figure 4:
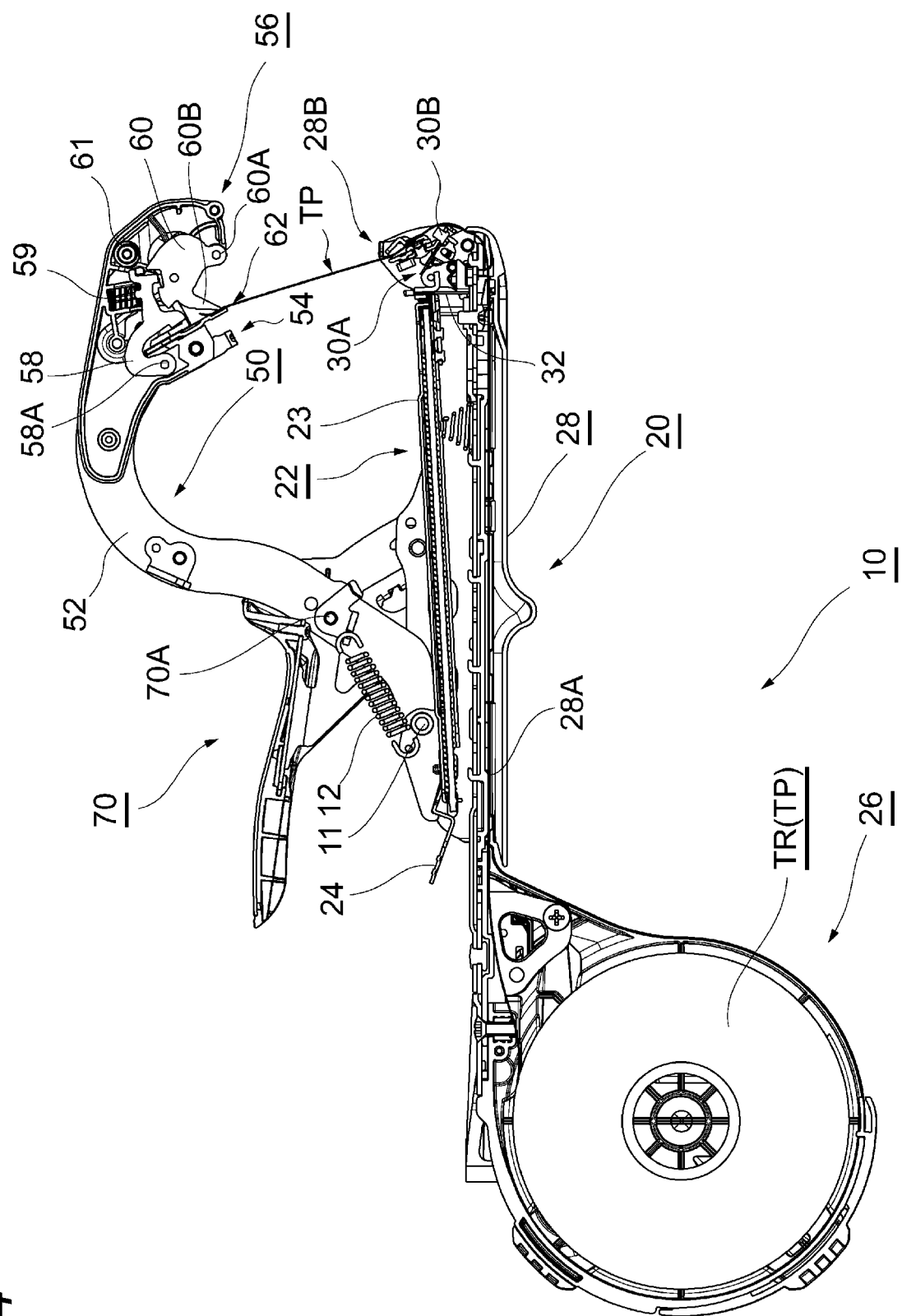
FIG. 4 is a cross-sectional view of the binding machine in a state where the tape is pulled out.

Further, when the clincher arm 50 rotates in the closing direction to a predetermined position with respect to the main handle 20, the tape holding unit 56 of the clincher arm 50 holds the tape TP in order to pull out the tape TP (see FIG. 4).

Thereafter, when gripping on the main handle 20 is loosened to rotate the clincher arm 50 in the opening direction with respect to the main handle 20, as illustrated in FIG. 4, the tape holding unit 56 of the clincher arm 50 and the tape guide 28B of the main handle 20 are separated from each other with the tape TP being held, and the tape TP is stretched between the clincher arm 50 and the main handle 20.

Figure 5:
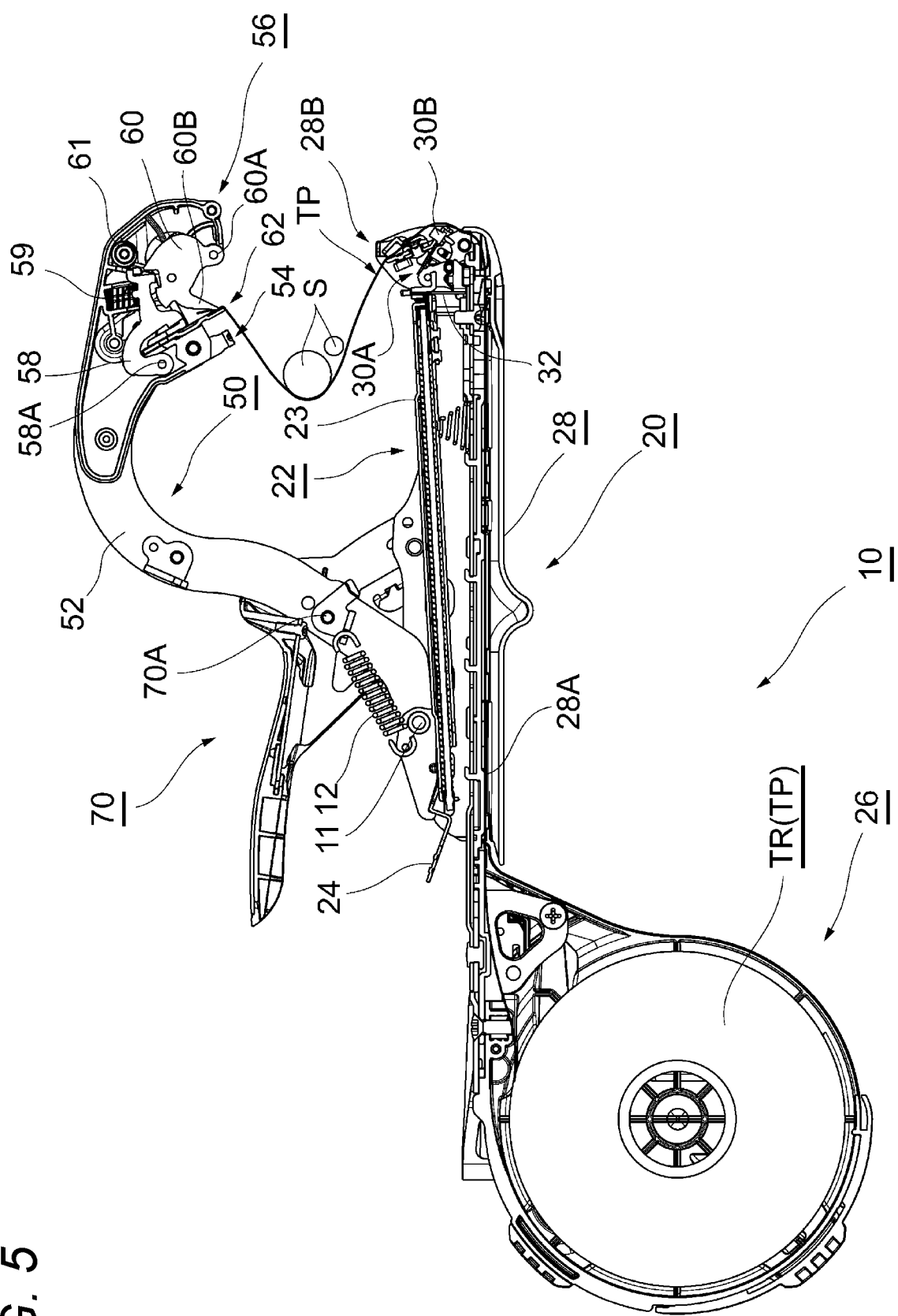
FIG. 5 is a cross-sectional view of the binding machine in a state where an object to be bound is inserted.
Figure 6:
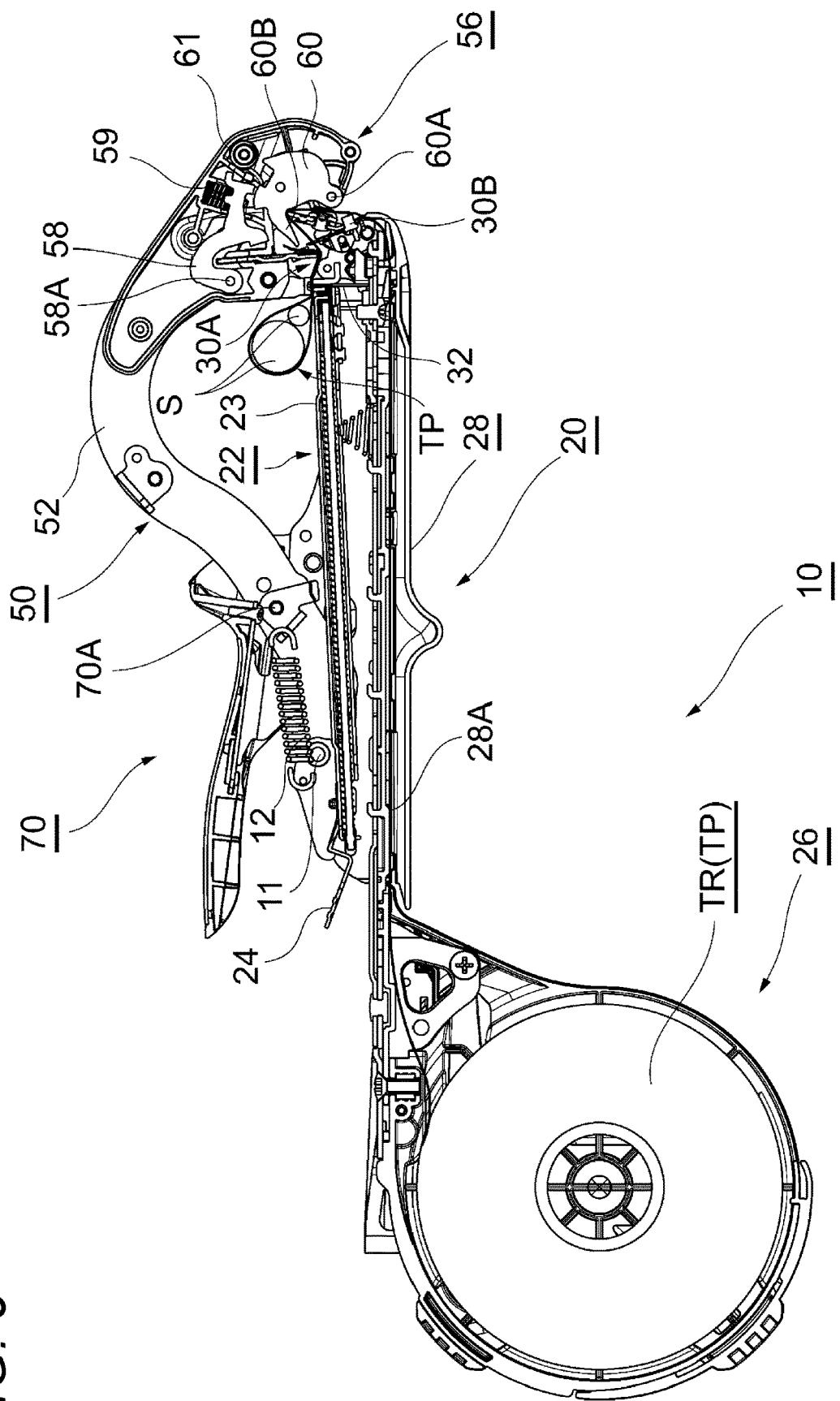
FIG. 6 is a cross-sectional view of the binding machine in a state where driving of a staple is started.

A step of winding the tape around the object S to be bound and overlapping two portions spaced apart of the tape TP by using the binding machine 10, and a tape overlapping member will be described. As illustrated in FIG. 5, when the object S to be bound such as plantlets or branches is inserted from an outer side of the stretched tape TP in this state and the clincher arm 50 is rotated again in the closing direction, a tape loop of the tape TP which binds the object S to be bound is formed as illustrated in FIG. 6.

A step of penetrating the overlapped portions of the tape TP with at least the first leg portion 101 (see FIG. 9) of the staple ST, and a penetrating member will be described. Since the staple magazine unit 22 is rotated in the closing direction by being pressed by the clincher arm 50, the staple ST is driven by the staple driver 32.

In a next step and with a tape sandwiching member, a first connection portion as a connection portion between the first leg portion 101 and the crown portion 100 is bend such that a tip 101D (see FIG. 9) of the first leg portion 101 is deviated (see FIG. 11) from the crown portion 100 (see FIG. 9), to sandwich the overlapped portions of the tape TP with both the crown portion 100 and the first leg portion 101. A second connection portion as a connection portion between the second leg portion 102 and the crown portion 100 is bent such that a tip 102D (see FIG. 9) of the second leg portion 102 is deviated from the crown portion 100 and is substantially in parallel to the first leg portion 101 (see FIG. 11), to sandwich the overlapped portions of the tape TP with both the crown portion 100 and the second leg portion 102.

Figure 7:
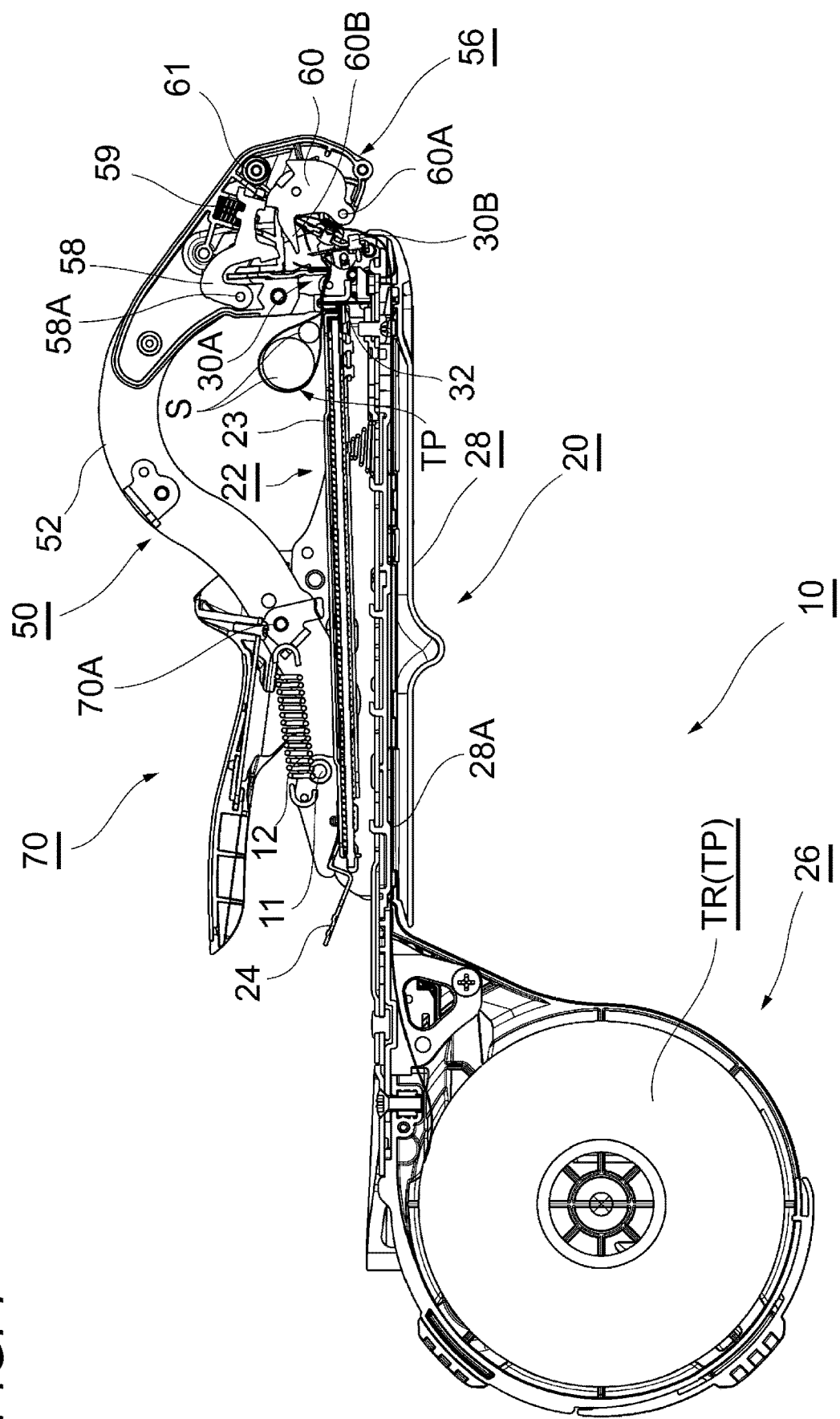
FIG. 7 is a cross-sectional view of the binding machine in a state where the staple is being driven.
Figure 8:
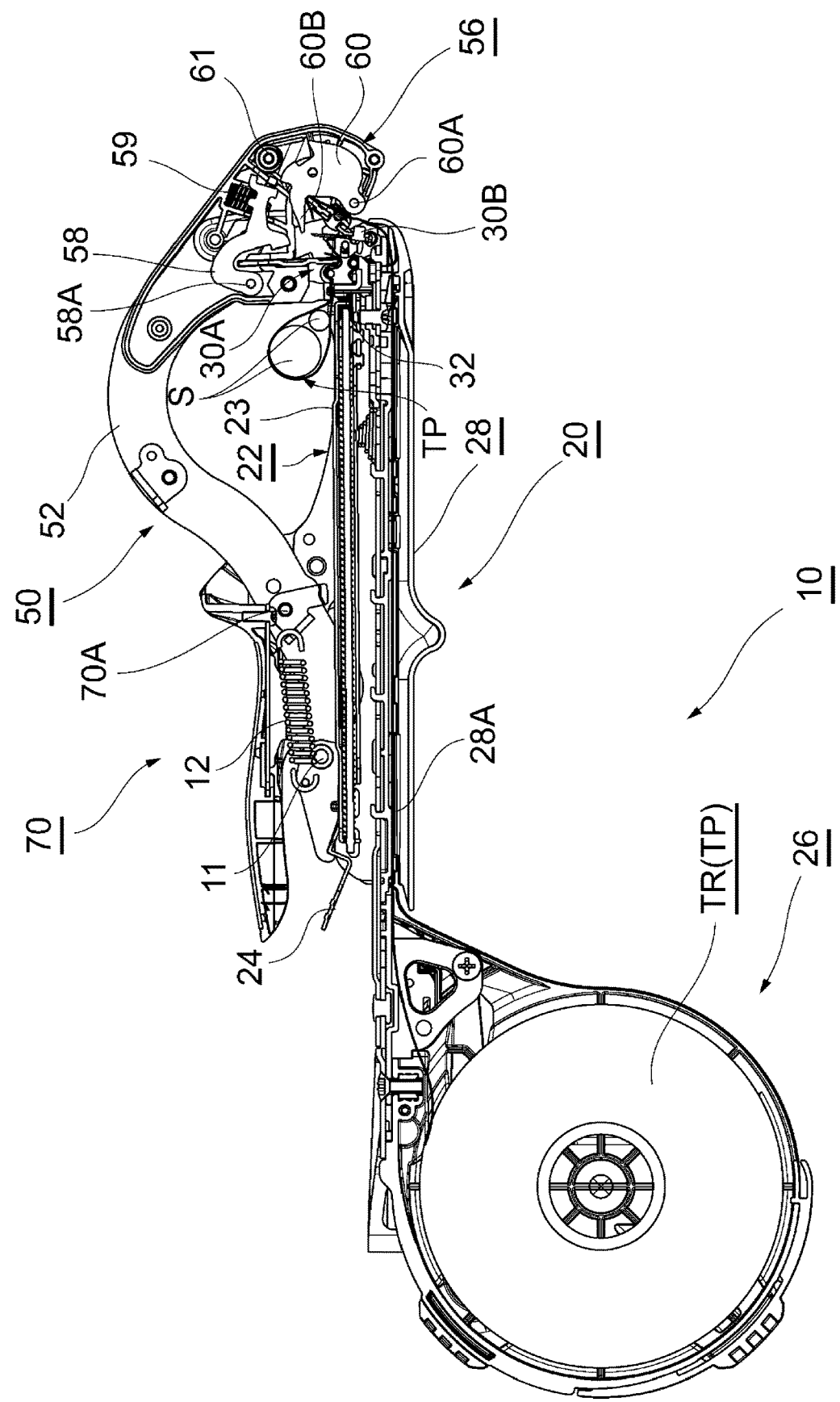
FIG. 8 is a cross-sectional view of the binding machine in a state where driving of the staple is completed.

Accordingly, as illustrated in FIGS. 7 and 8, both ends of the tape loop for binding the object S to be bound are bound by the staple ST. Further, the tape TP is cut by the cutting blade 30A, and the binding operation is performed. As described, the holding operation is performed in a first gripping operation, and the binding operation is performed in a second gripping operation. Further, by alternately performing the holding operation and the binding operation, the object S to be bound can be bound.

Hereinafter, the characteristic structure of the binding machine 10 will be described in detail.

[Staple and Clincher]

Figure 9:
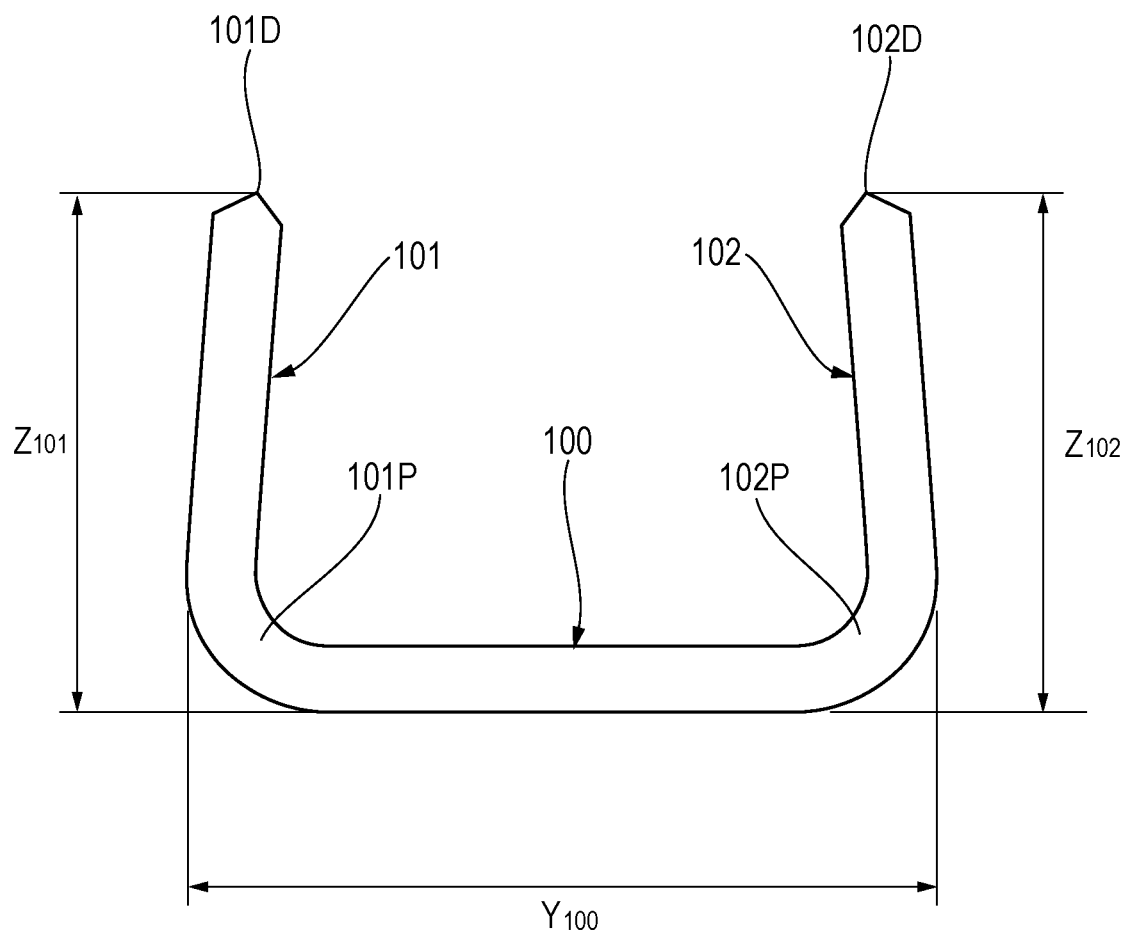
FIG. 9 is a front view of the staple used in the binding machine.

FIG. 9 is a front view of the staple ST used in the binding machine 10. As illustrated in FIG. 9, the staple ST is formed by pressing, for example, a steel wire joined with an adhesive in a U shape. Each staple ST has the crown portion 100, the first leg portion 101, and the second leg portion 102. The crown portion 100 is formed in a substantially linear shape and extends in a direction orthogonal to an arrangement direction of a plurality of staples ST arranged in a row.

A base end 101P of the first leg portion 101 is connected to one end of the crown portion 100. The first connection portion includes the base end 101P of the first leg portion 101 and a portion in the vicinity thereof. A base end 102P of the second leg portion 102 is connected to the other end of the crown portion 100. The second connection portion includes the base end 102P and a portion in the vicinity thereof.

With respect to the staple ST according to each embodiment of the present invention, the first leg portion 101 is formed to have a length (length of the needle leg) $Z_{101}$ larger than half the length (shoulder width) $Y_{100}$ of the crown portion 100. Similarly, the second leg portion 102 is formed to have a length $Z_{102}$ larger than half the length $Y_{100}$ of the crown portion 100. In the illustrated example, the lengths $Z_{101}$ and $Z_{102}$ of the first and second leg portions 101 and 102 are smaller than the length $Y_{100}$ of the crown portion 100.

Figure 10:
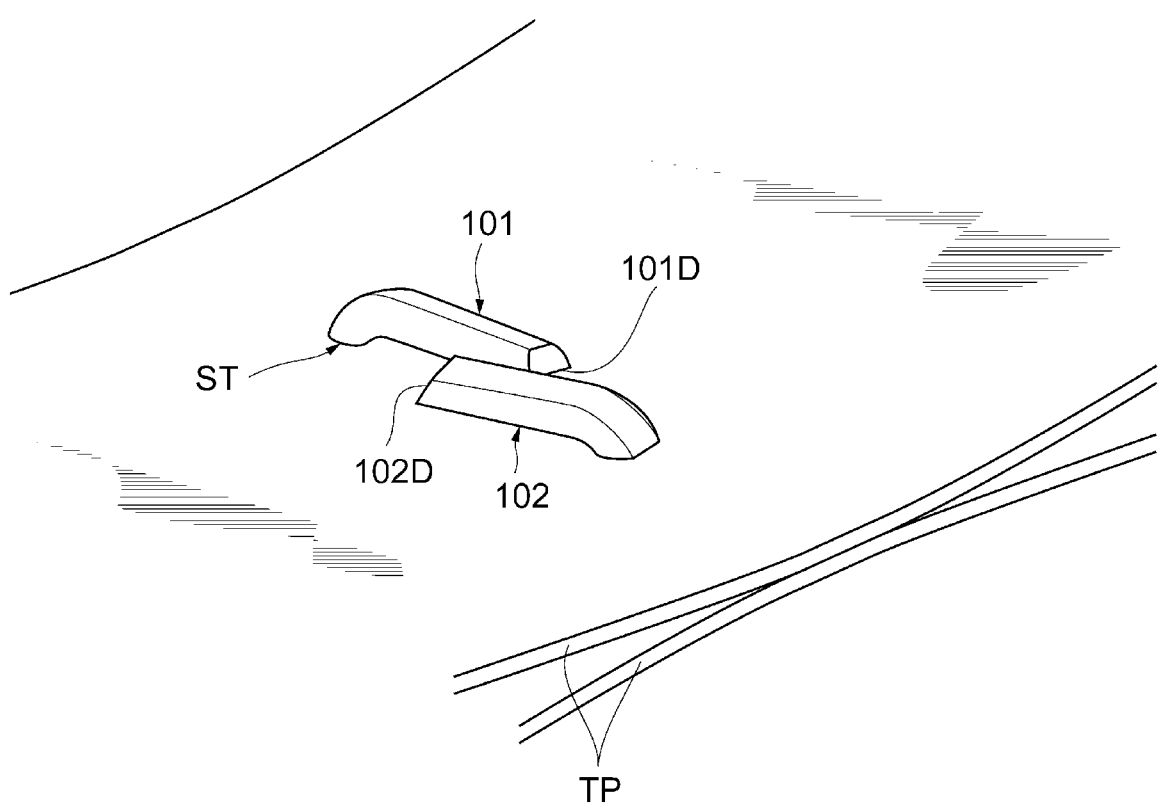
FIG. 10 is a perspective view of the staple in a state where the tape is bound.
Figure 11:
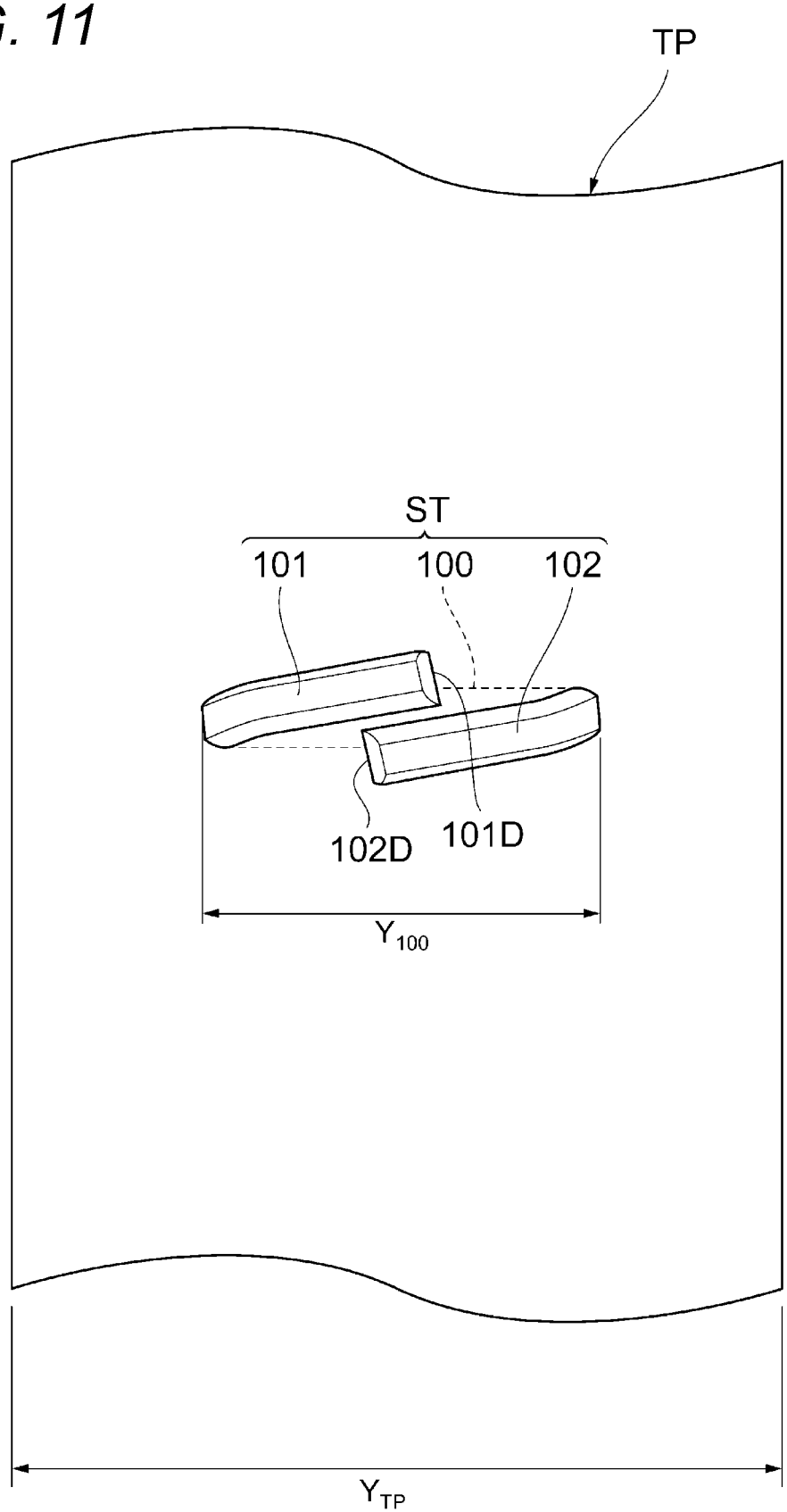
FIG. 11 is a plan view of the staple illustrated in FIG. 10.

FIG. 10 is a perspective view of the staple ST in a state where the tape TP is bound. One of characteristics of the staple ST according to the present embodiment is that the first leg portion 101 and the second leg portion 102 are clinched so as to intersect with each other as illustrated in FIG. 10. The clinched first and second leg portions 101 and 102 are partially overlapped in a width direction of the crown portion 100, and the tape TP can be bound even when the lengths $Z_{101}$ and $Z_{102}$ of the first and second leg portions 101 and 102 is larger than half the length $Y_{100}$ of the crown portion 100. FIG. 11 is a plan view of the staple ST illustrated in FIG. 10. In the example illustrated in FIG. 11, the length $Y_{100}$ of the crown portion 100 is larger than half the width $Y_{TP}$ of the tape TP.

Figure 12:
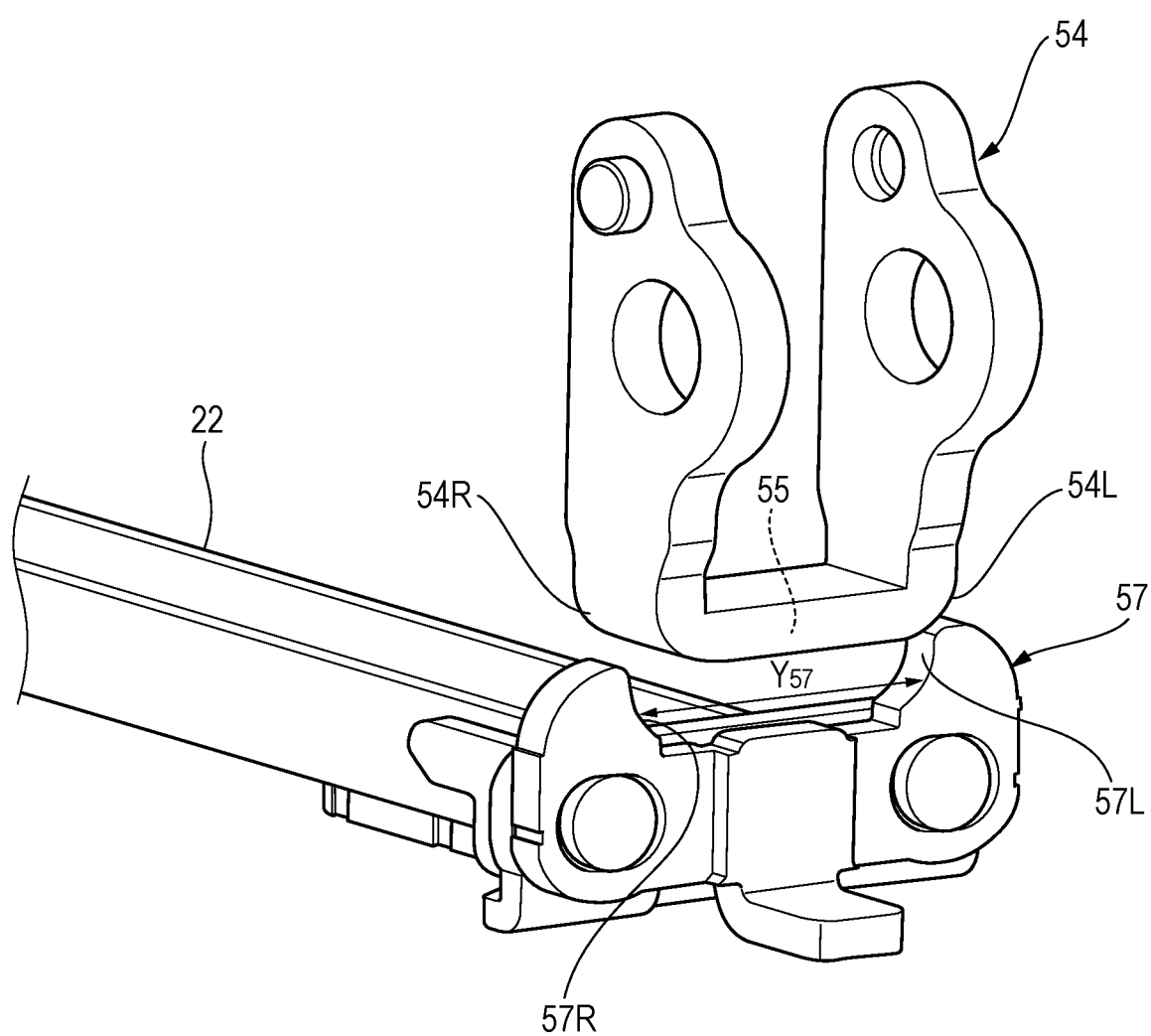
FIG. 12 is a perspective view of a clincher of the binding machine according to the first embodiment of the present invention.

FIG. 12 is a perspective view of the clincher 54 according to the first embodiment of the present invention. In the illustrated example, the clincher 54 is a sheet metal member integrally formed by performing press working on a rolled steel plate or the like, and is formed in a substantially U shape. At head of the staple magazine unit 22, a guiding portion 57 formed in a substantially U shape that is one size larger than the clincher 54 is provided. The guiding portion 57 regulates a position of the clincher 54 in the axial direction Y of the clincher arm 50 in a state where the clincher 54 is in close proximity to the staple magazine unit 22. The guiding portion 57 has a pair of left and right guide surfaces 57L and 57R inclined such that a gap $Y_{57}$ in the axial direction Y increases toward the clincher 54.

Figure 13:
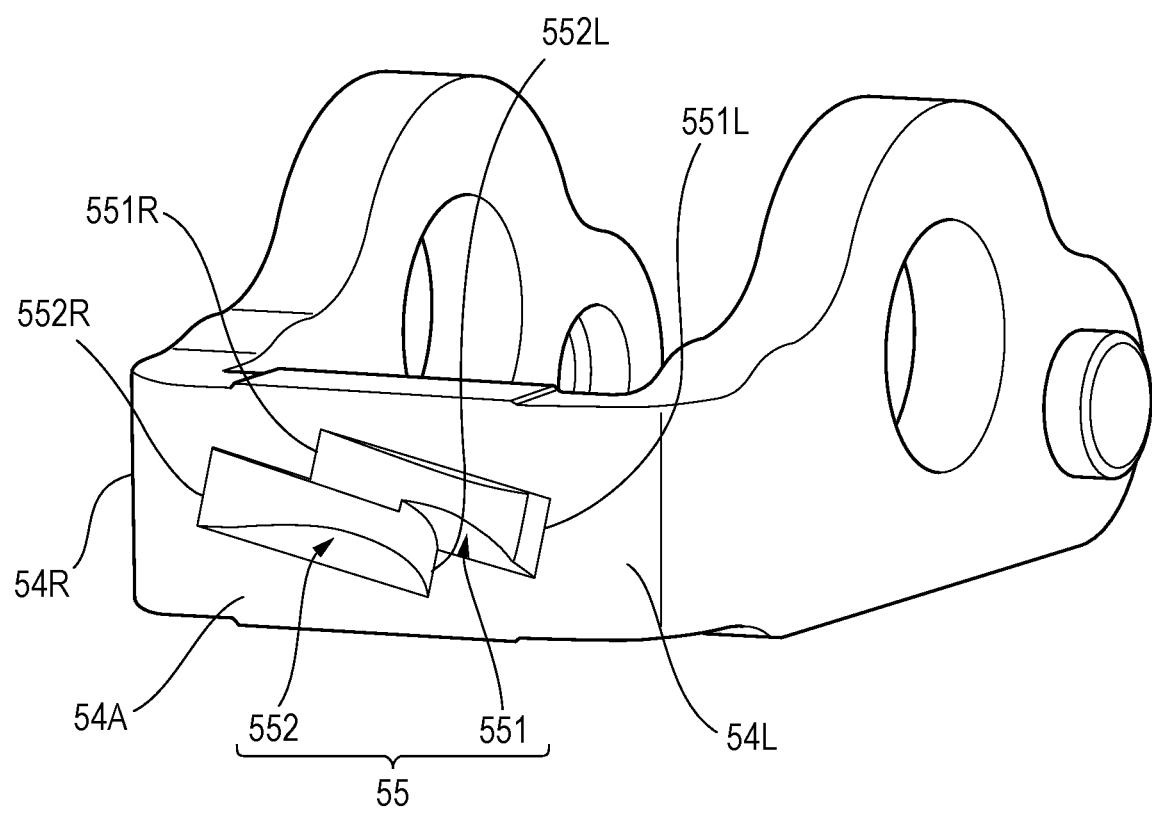
FIG. 13 is a perspective view of the clincher illustrated in FIG. 12 as viewed from a staple magazine unit side.

FIG. 13 is a perspective view of the clincher 54 illustrated in FIG. 12 as viewed from the staple magazine unit 22 side. A groove 55 is provided on a surface 54A facing the staple magazine unit 22. The clincher 54 has a pair of left and right surfaces 54L and 54R to be guided located on opposite sides with the groove 55 provided therebetween.

As illustrated in FIGS. 12 and 13, the surfaces 54L and 54R to be guided are inclined away from the staple magazine unit 22 as going leftward or rightward from the groove 55 at the center. In a state where the clincher 54 is in close proximity to the staple magazine unit 22, one surface 54L to be guided faces one guide surface 57L, and the other surface 54R to be guided faces the other guide surface 57R.

When a tip of the clincher arm 50 is displaced to the right or left with respect to the main handle 20 in the binding operation, one of the surfaces 54L and 54R to be guided of the clincher 54 is in sliding contact with one of the guide surfaces 57L and 57R of the guiding portion 57 correspondingly. In the guiding portion 57, the gap $Y_{57}$ between the guide surfaces 57L and 57R decreases toward the staple driver 32 opposite the clincher 54. Therefore, the groove 55 of the clincher 54 is guided so as to face the leading staple ST that is driven from the staple magazine unit 22 by the staple driver 32.

Figure 14:
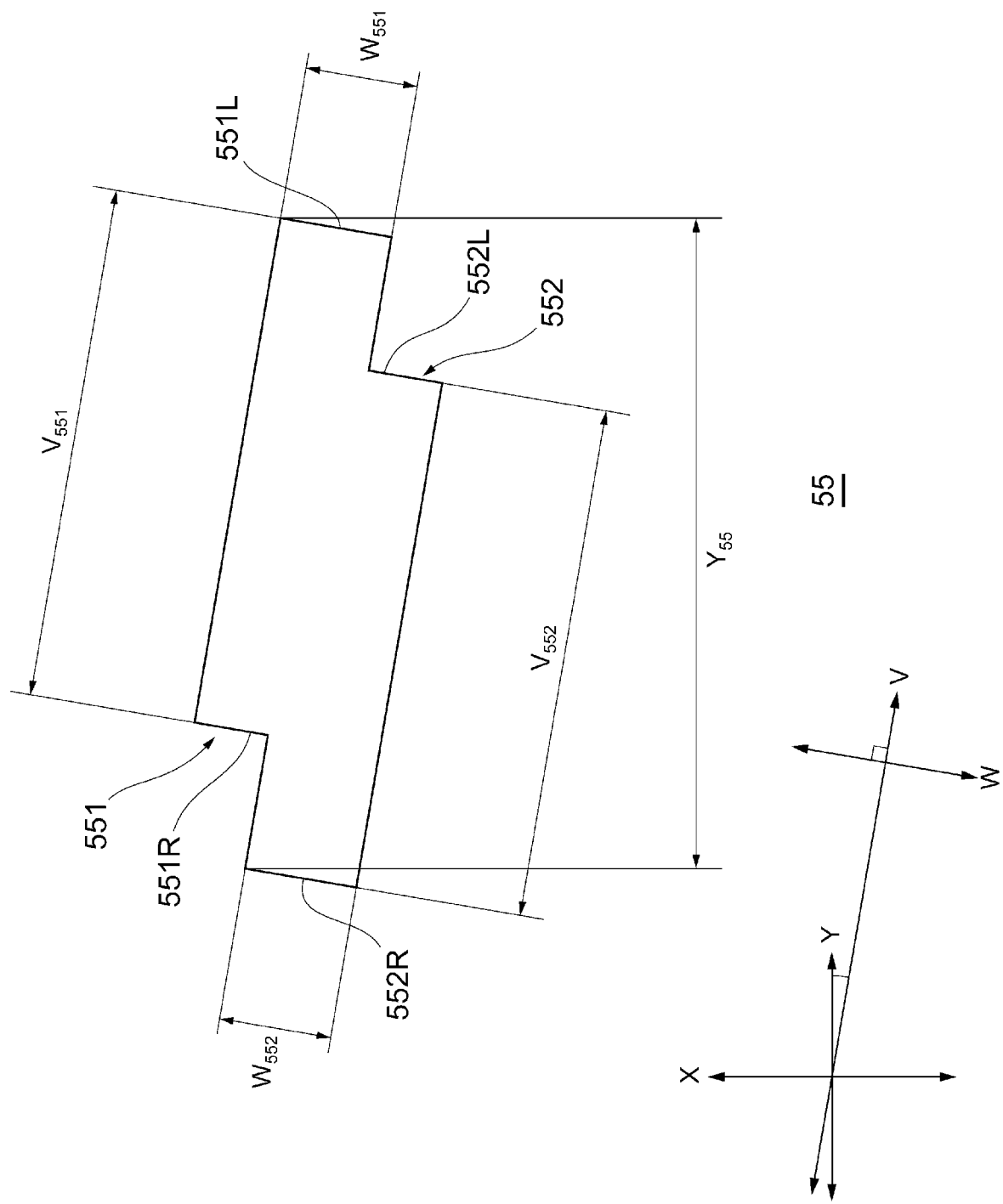
FIG. 14 is a diagram schematically illustrating a groove illustrated in FIG. 13.

The groove 55 includes a first groove 551 for guiding the first leg portion 101 of the staple ST and a second groove 552 for guiding the second leg portion 102 of the staple ST. FIG. 14 is a diagram schematically illustrating the groove 55. As illustrated in FIG. 14, the first groove 551 extends along a direction V that intersects the axial direction Y of the rotation shaft of the clincher arm 50 at an acute angle (hereinafter referred to as an acute angle direction). Similarly, the second groove 552 extends along the acute angle direction V.

A length of the first groove 551 in the acute angle direction V is taken as a first groove length $V_{551}$, and a length of the first groove 551 in a width direction W orthogonal to the acute angle direction V is taken as a first groove width $W_{551}$. Similarly, a length of the second groove 552 in the acute angle direction V is taken as a second groove length $V_{552}$, and a length of the second groove 552 in the width direction W is taken as a second groove width $W_{552}$.

The first groove 551 extends from a first end portion 551L to a second end portion 551R, being directed from an outer side (a first side) toward an inner side (a second side) in the axial direction Y. For example, the first groove 551 is formed such that a depth from the surface 54A gradually increases as it gets away from the first end portion 551L, and a depth from the surface 54A gradually decreases as it approaches the second end portion 551R.

Similarly, the second groove 552 extends from a third end portion 552R to a fourth end portion 552L, being directed from the other outer side (the second side) toward the inner side (the first side) in the axial direction Y. For example, the second groove 552 is formed such that a depth from the surface 54A gradually increases as it gets away from the third end portion 552R, and a depth from the surface 54A gradually decreases as it approaches the fourth end portion 552L.

The second groove 552 is shifted with respect to the first groove 551 in the width direction W of the grooves 551 and 552. In the illustrated example, the first groove 551 and the second groove 552 are formed so as to communicate with each other in a region between the fourth end portion 552L and the second end portion 551R. In the illustrated example, a sum of the first groove length $V_{551}$ of the first groove 551 and the second groove length $V_{552}$ of the second groove 552 is larger than a length $Y_{55}$ from the first end portion 551L to the third end portion 552R. That is, at least a prat of the first groove 551 in its length direction and at least a part of the second groove 552 in its length direction overlap with each other.

According to the binding machine 10 of the first embodiment of the present invention configured as described above, as illustrated in FIG. 10, the first and second leg portions 101 and 102 of the staple ST can be clinched so as to intersect with each other, in other words, at least a prat of the first leg portion 101 in its length direction and at least a part of the second leg portion 102 in its length direction overlap with each other. Since the first and second leg portions 101 and 102 intersect with each other even when the staple ST sticks out from the tape TP, one of the first and second leg portions 101 and 102 is caught in the tape TP, and the staple ST is less likely to come off from the tape TP. This provides a binding machine with which the bound tape TP is less likely to come off from vines or stems of a plant even when the staple ST is displaced.

The width of the tape TP is selected according to the length $Y_{100}$ of the crown portion 100 so that the staple ST does not stick out in the width direction of the tape TP. According to the first embodiment, the clinched first and second leg portions 101 and 102 partially overlap with each other in the width direction of the crown portion 100, that is, in the longitudinal direction of the binding machine 10. Since the length $Y_{100}$ of the crown portion 100 can be made smaller than the sum of the length $Z_{101}$ of the first leg portion 101 and the length $Z_{102}$ of the second leg portion 102, the width $Y_{TP}$ of the tape TP can be reduced. As a result, the cost of the tape TP can be reduced.

According to the first embodiment, since it is not necessary to excessively shorten the lengths $Z_{101}$ and $Z_{102}$ of the first and second leg portions 101 and 102, moment at the time of bending the first and second leg portions 101 and 102 does not decrease. Since the load required to clinch the staple ST is not increased, the tape TP can be narrowed without increasing the burden on the user.

In the binding operation, it is necessary to insert the object S to be bound such as plantlets or branches between the clincher arm 50 and the main handle 20. When the clincher arm 50 is greatly rotated in the opening direction, the clincher 54 may be displaced with respect to a tip of the staple magazine unit 22. Further, in the binding operation, at the time pressing the tape TP, which is stretched between the tip of the clincher arm 50 and the tip of the main handle 20, against the object S to be bound to wind the tape TP around the object S to be bound, the clincher 54 may be displaced with respect to the tip of the staple magazine unit 22.

According to the first embodiment, the guiding portion 57 that regulates a relative position between the clincher 54 and the staple magazine unit 22 is provided at the tip of the staple magazine unit 22. Since the groove 55 of the clincher 54 is guided so as to face the leading staple ST driven from the staple magazine unit 22 by the staple driver 32, the first and second leg portions 101 and 102 can be bent reliably at the groove 55, and the first and second leg portions 101 and 102 can be bent so as to intersect with each other as described above.

Second Embodiment

Figure 15:
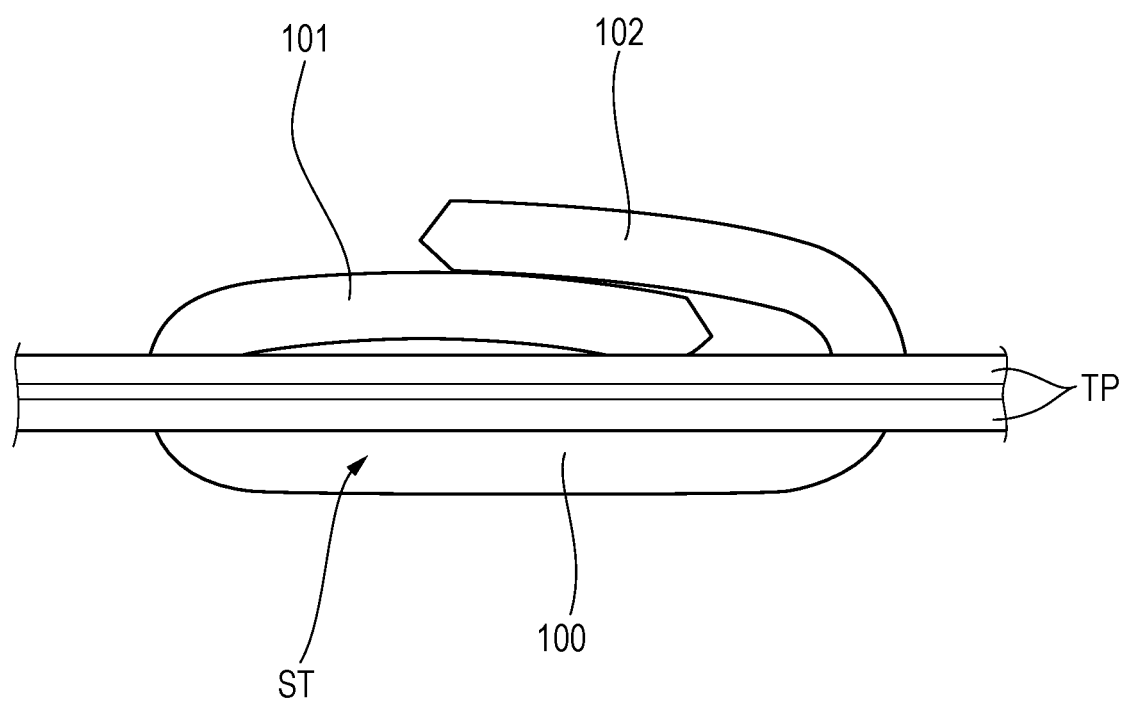
FIG. 15 is a cross-sectional view of the staple and the tape bound by a binding machine according to a second embodiment of the present invention.

For a second embodiment, description of matters common to the first embodiment will be omitted, and only different points will be described. FIG. 15 is a cross-sectional view of the staple ST and the tape TP bound by a binding machine 10 according to a second embodiment of the present invention. The second embodiment is different from the first embodiment in that the first and second leg portions 101 and 102 of the staple ST are not bent obliquely with respect to the crown portion 100 but overlap with each other in a thickness direction of the tape TP along the crown portion 100.

Figure 16:
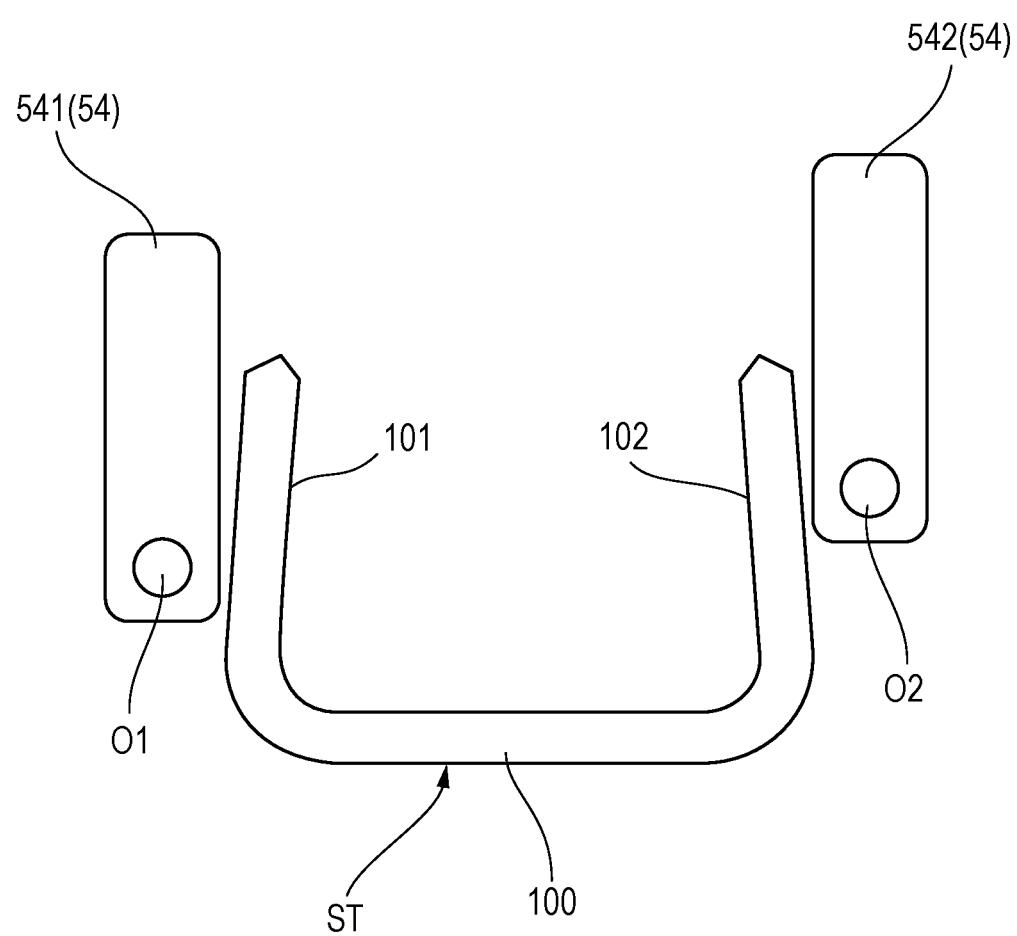
FIG. 16 is a diagram schematically illustrating an operation of a clincher of a binding machine according to a second embodiment of the present invention.
Figure 17:
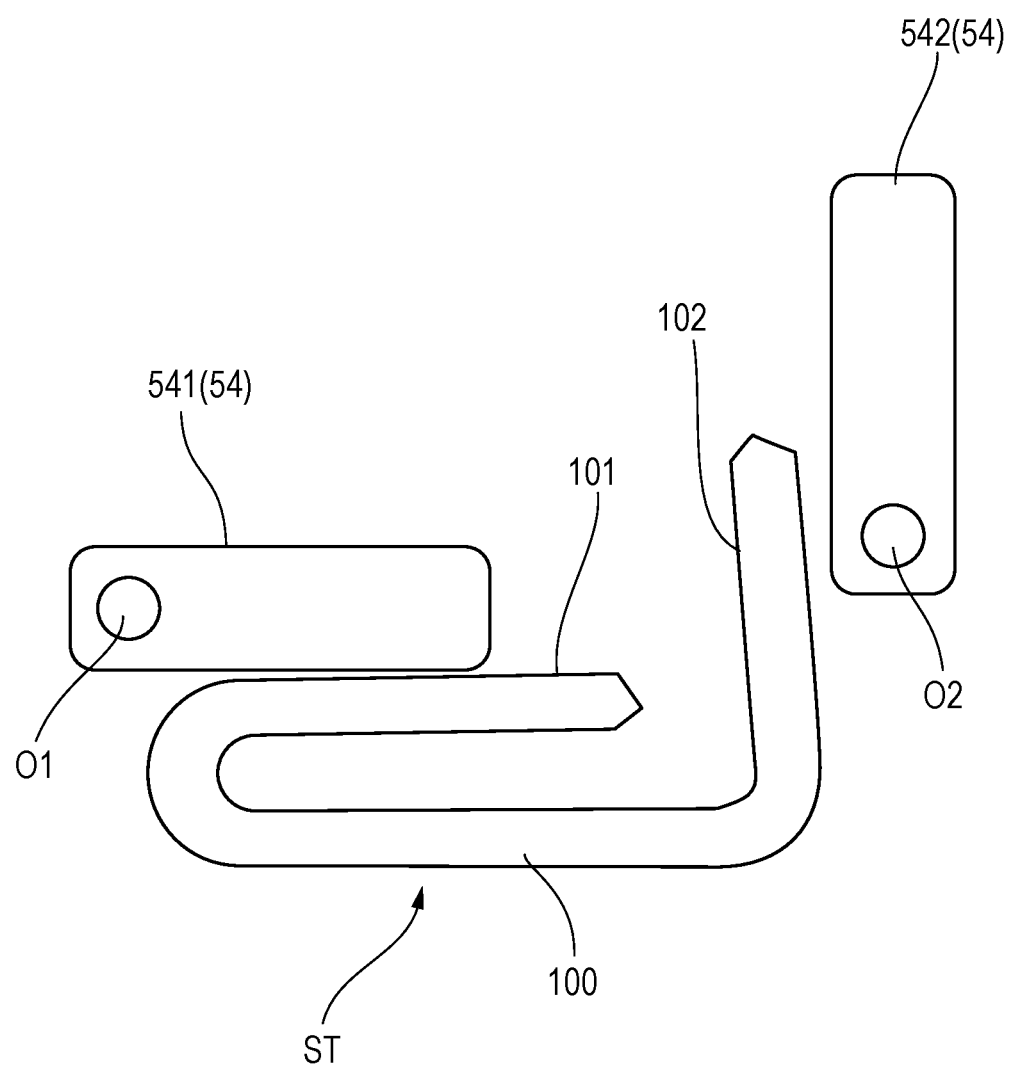
FIG. 17 is a diagram schematically illustrating an operation of the clincher following that in FIG. 16.
Figure 18:
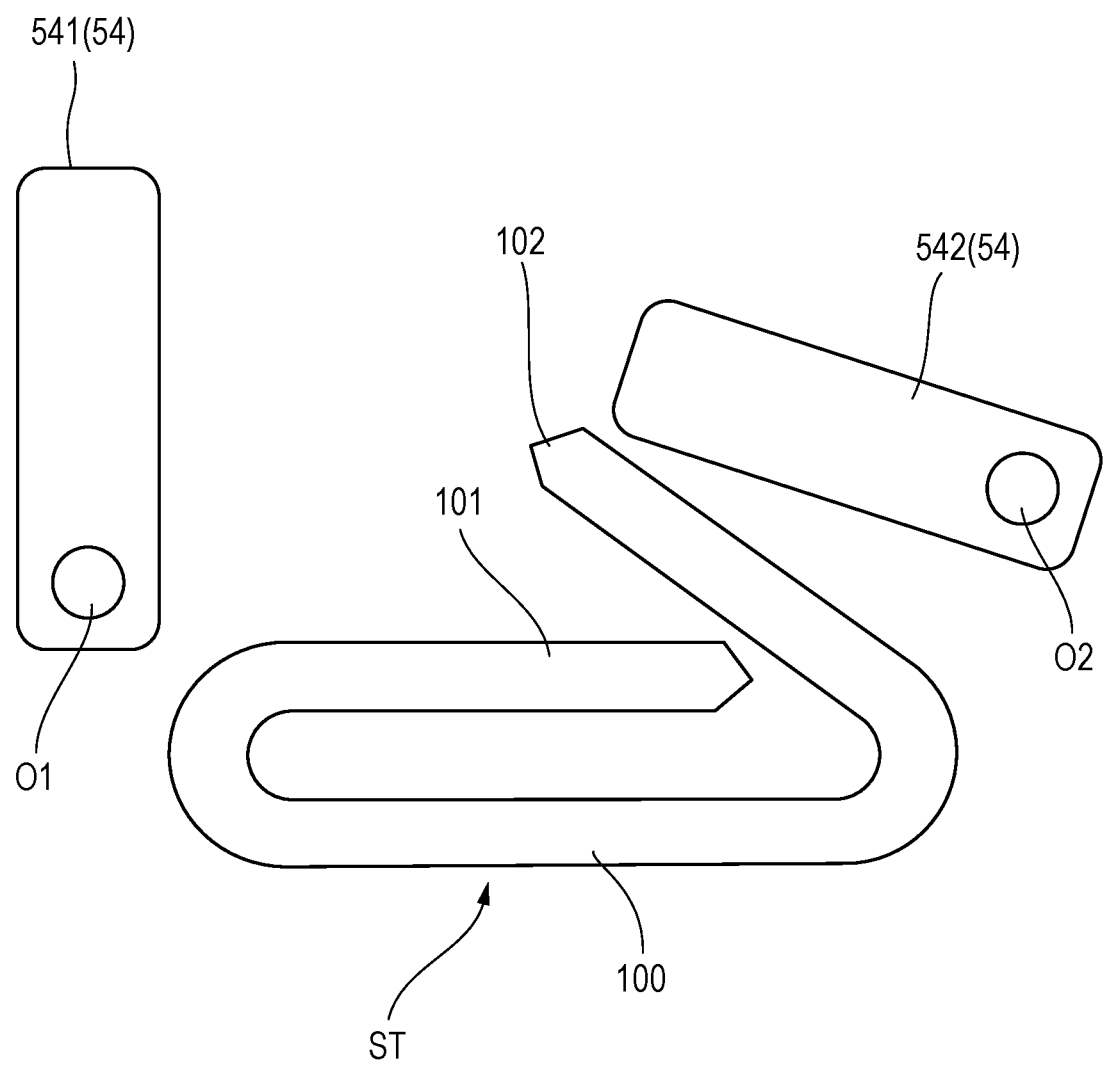
FIG. 18 is a diagram schematically illustrating an operation of the clincher following that in FIG. 17.
Figure 19:
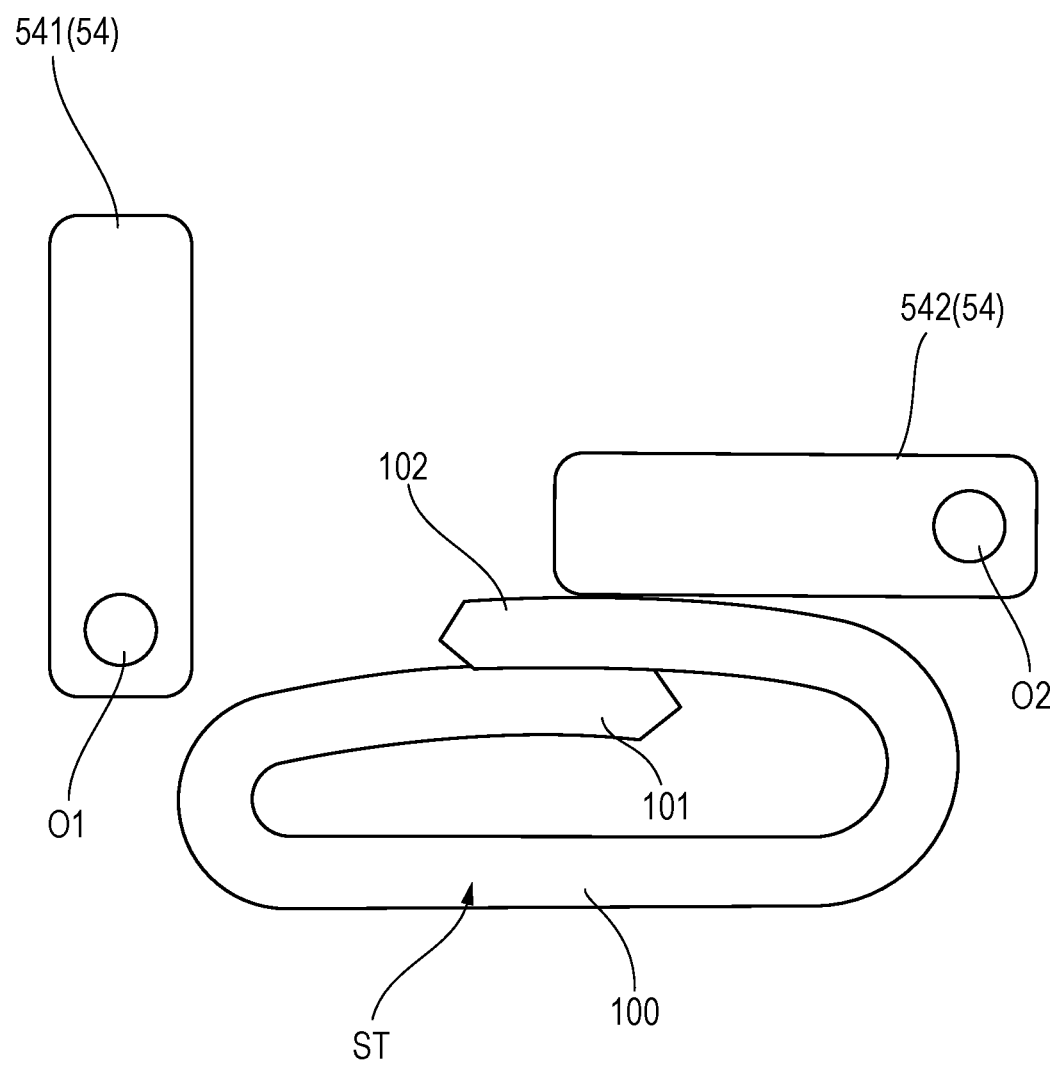
FIG. 19 is a diagram schematically illustrating an operation of the clincher following that in FIG. 18.

FIGS. 16 to 19 are diagrams schematically illustrating operations of the clincher 54 according to the second embodiment of the present invention. As illustrated in FIG. 16, the clincher 54 of the second embodiment includes a pair of bending arms 541 and 542 that rotate about the centers O1 and O2 respectively. After one bending arm 541 bends the first leg portion 101 as illustrated in FIG. 17, the other bending arm 542 bends the second leg portion 102 with a time difference as illustrated in FIG. 18. Accordingly, as illustrated in FIG. 19, the first and second leg portions 101 and 102 can be bent so as to overlap with each other in the thickness direction of the tape TP.

According to the second embodiment, similarly to the first embodiment, it is possible to provide a binding machine with which the bound tape TP is less likely to come off from the vines or stems of a plant even when the staple ST is displaced.

The embodiments described above are for facilitating understanding of the present invention and are not to be interpreted as limiting the present invention. The elements included in the embodiments and their arrangements, materials, conditions, shapes, sizes, and the like are not limited to those illustrated, and can be appropriately changed. Further, it is possible to partially replace or combine the configurations shown in different embodiments. For example, although the staple ST is used as a member for binding both ends of a tape loop, the present invention is not limited thereto, and the tape loop may be bound by another member.

According to an aspect of the invention, a binding machine that binds objects with a tape, the binding machine includes: a staple magazine unit configured to accommodate a plurality of staples; a main handle to which the staple magazine unit is attached; a clincher arm rotatably attached to the main handle such that the clincher arm approaches a leading staple of the plurality of staples; and a clincher provided on the clincher arm, and configured to bend the leading staple, which is driven from the staple magazine unit and penetrates overlapped portions of the tape, when the clincher arm is rotated to approach the leading staple. The clincher has, on a surface thereof, a first groove that extends in an acute angle direction with respect to an axial direction of a rotation shaft of the clincher arm and has a first groove length and a first groove width, and a second groove that extends in an acute angle direction with respect to the axial direction of the rotation shaft of the clincher arm and has a second groove length and a second groove width, wherein the second groove is disposed offset with respect to the first groove in a width direction of the first groove.

The binding machine may further includes: a guiding portion provided at a tip of the staple magazine unit and configured to regulate a position of the clincher in the axial direction of the rotation shaft of the clincher arm in a state where the clincher is in close proximity to the staple magazine unit. The guiding portion may have a pair of guide surfaces inclined such that a gap therebetween increases toward the clincher. The clincher may further have a pair of surfaces to be guided that are located on opposite sides of the first groove and the second groove and that are inclined away from the staple magazine unit as getting away from the first groove and the second groove, and in a state where the clincher is in close proximity to the staple magazine unit, one of the pair of surfaces to be guided faces one of the pair of guide surfaces, and another of the pair of surfaces to be guided faces another of the pair of guide surfaces.

The second groove may be disposed offset with respect to the first groove in a length direction of the first groove.

The first groove may extend from a first end portion thereof to a second end portion thereof, directing from a first side toward a second side of the clincher in the axial direction of the rotation shaft of the clincher, and has a depth from the surface of the clincher gradually increasing as it gets away from the first end portion and gradually decreasing as it approaches the second end portion.

The second groove may extend from a third end portion thereof to a fourth end portion thereof, directing from the second side toward the first side of the clincher in the axial direction of the rotation shaft of the clincher, and has a depth from the surface of the clincher gradually increasing as it gets away from the third end portion and gradually decreasing as it approaches the fourth end portion.

A sum of the first groove length and the second groove length may be larger than a length from the first end portion to the third end portion.

The second end portion of the first groove and the fourth end portion of the second groove may communicate with each other.

According to an aspect of the invention, a binding method for binding objects with a tape implemented by using a binding machine, the method includes: winding the tape around the objects to bound such that two portions spaced apart of the tape overlap with each other; penetrating overlapped portions of the tape with at least a first leg portion of a staple, which includes a crown portion having a length greater than half a width of the tape, the first leg portion having a length greater than half the length of the crown portion and less than the length of the crown portion and extending from one end of the crown portion, and a second leg portion having a length greater than half the length of the crown portion and less than the length of the crown portion and extending from another end of the crown portion; and sandwiching the overlapped portions of the tape with the crown portion and the first leg portion by bending a first connection portion between the first leg portion and the crown portion such that a tip of the first leg portion is deviated from the crown portion, and sandwiching the overlapped portions of the tape with the crown portion and the second leg portion by bending a second connection portion between the second leg portion and the crown portion such that a tip of the second leg portion is deviated from the crown portion and is substantially in parallel to the first leg portion.

According to an aspect of the invention, a binding machine that binds objects with a tape, the binding machine includes: a tape overlapping member configured to wind the tape around the objects to bound such that two portions spaced apart of the tape overlap with each other; a penetrating member configured to penetrate overlapped portions of the tape with at least a first leg portion of a staple, which includes a crown portion having a length greater than half a width of the tape, the first leg portion having a length greater than half the length of the crown portion and less than the length of the crown portion and extending from one end of the crown portion, and a second leg portion having a length greater than half the length of the crown portion and less than the length of the crown portion and extending from another end of the crown portion; and a sandwiching member configured to sandwich the overlapped portions of the tape with the crown portion and the first leg portion by bending a first connection portion between the first leg portion and the crown portion such that a tip of the first leg portion is deviated from the crown portion, and configured to sandwich the overlapped portions of the tape with the crown portion and the second leg portion by bending a second connection portion between the second leg portion and the crown portion such that a tip of the second leg portion is deviated from the crown portion and is substantially in parallel to the first leg portion.

According to the present invention as described above, there is provided a binding machine capable of preventing the bounding tape from coming off from vines or stems of a plant even when the staple is displaced.

What is claimed is:

1. A binding machine that binds objects with a tape, the binding machine comprising:
    a staple magazine unit configured to accommodate a plurality of staples;
    a main handle to which the staple magazine unit is attached;
    a clincher arm rotatably attached to the main handle such that the clincher arm approaches a leading staple of the plurality of staples; and
    a clincher provided on the clincher arm, and configured to bend the leading staple, which is driven from the staple magazine unit and penetrates overlapped portions of the tape, when the clincher arm is rotated to approach the leading staple, wherein
    the clincher has, on a surface thereof,
        a first groove that extends in an acute angle direction with respect to an axial direction of a rotation shaft of the clincher arm and has a first groove length and a first groove width, and
        a second groove that extends in an acute angle direction with respect to the axial direction of the rotation shaft of the clincher arm and has a second groove length and a second groove width, wherein the second groove is disposed offset with respect to the first groove in a width direction of the first groove, the first groove extends from a first end portion thereof to a second end portion thereof, directing from a first side toward a second side of the clincher in the axial direction of the rotation shaft of the clincher, the second groove extends from a third end portion thereof to a fourth end portion thereof, directing from the second side toward the first side of the clincher in the axial direction of the rotation shaft of the clincher, the first groove and the second groove communicate with each other in a region between the second end portion of the first groove and the fourth end portion of the second groove, and a width of the region where the first groove and the second groove communicate with each other is smaller than a sum of the first groove width and the second groove width.

2. The binding machine according to claim 1, further comprising:

a guiding portion provided at a tip of the staple magazine unit and configured to regulate a position of the clincher in the axial direction of the rotation shaft of the clincher arm in a state where the clincher is in close proximity to the staple magazine unit, wherein the guiding portion has a pair of guide surfaces inclined such that a gap therebetween increases toward the clincher, the clincher further has a pair of surfaces to be guided that are located on opposite sides of the first groove and the second groove and that are inclined away from the staple magazine unit going away from the first groove and the second groove, and in a state where the clincher is in close proximity to the staple magazine unit, one of the pair of surfaces to be guided faces one of the pair of guide surfaces, and another of the pair of surfaces to be guided faces another of the pair of guide surfaces.

3. The binding machine according to claim 1, wherein the second groove is disposed offset with respect to the first groove in a length direction of the first groove.

4. The binding machine according to claim 3, wherein the first groove has a depth from the surface of the clincher gradually increasing going away from the first end portion and gradually decreasing as it approaches the second end portion.

5. The binding machine according to claim 4, wherein the second groove has a depth from the surface of the clincher gradually increasing going away from the third end portion and gradually decreasing as it approaches the fourth end portion.

6. The binding machine according to claim 5, wherein a sum of the first groove length and the second groove length is larger than a length from the first end portion to the third end portion.

7. The binding machine according to claim 1, wherein the first groove has a depth from the surface of the clincher gradually increasing going away from the first end portion and gradually decreasing as it approaches the second end portion.

8. The binding machine according to claim 7, wherein the second groove has a depth from the surface of the clincher gradually increasing going away from the third end portion and gradually decreasing as it approaches the fourth end portion.

9. The binding machine according to claim 8, wherein a sum of the first groove length and the second groove length is larger than a length from the first end portion to the third end portion.

10. The binding machine according to claim 1, wherein the second groove has a depth from the surface of the clincher gradually increasing going away from the third end portion and gradually decreasing as it approaches the fourth end portion.

11. The binding machine according to claim 10, wherein a sum of the first groove length and the second groove length is larger than a length from the first end portion to the third end portion.

* * * * *